United States Patent [19]

Jones, Jr. et al.

[11] 3,894,162

[45] July 8, 1975

[54] METHOD OF MAKING FRESH SKINLESS SAUSAGE

[75] Inventors: Edward Cole Jones, Jr.; Gerald Robert Johnson, both of Fort Atkinson, Wis.

[73] Assignee: Jones Dairy Farm, Fort Atkinson, Wis.

[22] Filed: Sept. 26, 1974

[21] Appl. No.: 509,459

[52] U.S. Cl. ............... 426/442; 426/149; 426/371; 426/506; 426/513
[51] Int. Cl. ............................................ A22c 11/00
[58] Field of Search .......... 426/105, 148, 149, 315, 426/371, 442, 506, 513, 524; 17/34

[56] References Cited
UNITED STATES PATENTS

| | | | |
|---|---|---|---|
| 1,964,010 | 6/1934 | Vogt | 426/315 |
| 3,500,743 | 3/1970 | Cameron | 17/34 |

*Primary Examiner*—Hyman Lord
*Attorney, Agent, or Firm*— Andrus, Sceales, Starke & Sawall

[57] ABSTRACT

A meat formulation containing from 20 to 50% fat is comminuted and then encased in a cellulose or other suitable water permeable casing and linked. The linked product is reduced in temperature to below 32°F and while at this temperature, the casing is wetted out and peeled from the product to provide the fresh skinless sausage.

8 Claims, No Drawings

METHOD OF MAKING FRESH SKINLESS SAUSAGE

BACKGROUND OF THE INVENTION

Fresh linked sausage has been prepared in the past by emulsifying a meat formulation and then encasing the formulation in an animal-derived casing. More recently, regenerated cellulose casings have been used in place of the animal casing, and the cellulose casing is removed from the sausage prior to marketing to provide what is known as skinless sausage. A method of making skinless sausage is disclosed in U.S. Pat. No. 3,500,743 in which the comminuted meat formulation is stuffed into regenerated cellulose casing, linked, and thereafter the linked product is heated for a period of time sufficient to coagulate the protein at the outer surface layer of the product. Following this heating, the product is chilled to set the coagulated protein, and thereafter the casing is peeled from the product to provide the linked skinless sausage.

A heating process as disclosed in U.S. Pat. No. 3,500,743 has certain disadvantages in that the heating of the surface layer of the product, particularly when using pork, provides a whiteish appearance which can be objectionable to the consumer. Furthermore, the coagulated protein on the surface of the product is susceptible to oxidation which can cause rancidity of the product.

As a further disadvantage of the heating process for producing skinless sausage, the coagulated protein on the surface seals the surface fat with the result that there is little open fat at the surface of the sausage to fry out and to provide a cooking medium for the sausage.

Fresh skinless sausage have also been prepared by an extrusion method in which the fresh meat formulation is comminuted and extruded at a temperature of about 26°–28°F. As the product is being extruded, the links are cut to the desired length. These links have square ends which can be objectionable to the consumer.

SUMMARY OF THE INVENTION

The present invention is directed to a different and improved method of making fresh skinless sausage which overcomes the disadvantages accompanying the heating and extrusion methods. According to the invention, a meat formulation having about 20 to 50% fat is ground, chopped, or comminuted with the addition of spices. The comminuted fresh meat formulation is then encased in a regenerated cellulose or other water permeable casing and linked either by hand or with standard linking equipment. The linked product is then reduced in temperature to below 32°F, and preferably from −10°F to +22°F, to freeze the product. While at this temperature the casing is wetted out by immersing, or otherwise contacting, the linked product in water or a brine solution, causing the water to penetrate the casing and melt the frozen bond between the product and the casing. The casing is then peeled from the product to provide fresh skinless sausage links.

The method of the invention utilizes regenerated cellulose casings or other suitable synthetic, water permeable casings to provide a fresh skinless sausage and thereby eliminates the need for the expensive animal casings. Furthermore the process of the invention provides uniformity in size and shape as compared with sausage cased in animal casing.

As the method of the invention does not utilize heating, the outer surface of the sausage has a better surface color. When dealing with pork sausage, fresh pork is red in color but is off-white when cooked. Thus, skinless pork sausage prepared by the invention has a redder appearance which is more attractive to the consumer than sausage made by heating processes in which the outer surface is heated to coagulate the protein.

As the outer layer of the sausage is not subjected to heating and protein coagulation, there is no possibility of oxidation of cooked meat on the surface, thereby making the product more stable and enabling the sausage to be packed in various types of conventional packaging.

A further advantage of the fresh skinless sausage made in accordance with the invention is that the links have open fat on the surface which during cooking, provide a medium to aid in uniform cooking of the sausage.

DESCRIPTION OF THE PREFERRED EMBODIMENT

In accordance with the invention, a meat formulation containing approximately 20 to 50% by weight of fat is chopped or comminuted. The meat can be pork, beef, lamb, veal, or the like. The meats used for making the skinless sausages may be from frozen, chilled or pre-rigor meats.

When preparing the meats, they are comminuted to the desired particle size depending upon the size of the link and type of product being produced.

During the comminuting operation, the desired spices are added. In some cases, it may be desirable to add a small amount of water to the meat formulation prior to or during the comminuting processes, but the addition of water is not necessary to the process.

Following the comminuting or chopping operation, the fresh meat formulation is then encased in a water permeable casing, composed of a material such as regenerated cellulose or other synthetic material.

After stuffing, the casing is then linked to provide a series of interconnected links. Following the linking, the linked product is then frozen by chilling to a temperature below 32°F and preferably in the range of −10°F to +22°F. After the sausage has stabilized in temperature, the casing is wetted out by contact with water. Immersing the linked product in water or a brine solution, is a convenient method of wetting out the casing, causing the water to penetrate the casing and melt the frozen bond between the product and the casing. However, methods other than immersion can be used to wet out the casing, as for example, spraying the linked product with water, or a brine solution.

The temperature of the water and the time of contact are not critical. Preferably, iced water or brine solution is used having a temperature of about 26°F to 34°F and the product is maintained in contact with the water for a period of time sufficient to enable the water to penetrate the casing. For most operations a contact time of 2 minutes to 20 minutes is satisfactory to melt the interfacial frozen bond. Higher temperature water can be used, but the time of contact becomes more critical as the temperature of the water is increased, because the higher temperature water will tend to thaw the product as opposed to merely melting the interfacial frozen bond and thawing of the product may adversely effect the subsequent peeling operation.

After wetting out the casing, the casing is immediately removed by standard peeling or stripping equipment. In one common form of peeling equipment, the casing is slit longitudinally, the slit is spread apart by air jets and the spread casing is removed by vacuum means. Maintaining the product in a frozen condition is important during peeling because the high pressure air jets may tend to destroy the surface of the product if it is in a thawed condition.

The sausage links are then packaged and held in a refrigerated or frozen state for sale to the consumer.

Chilling the linked product to a low temperature of 10°F or below prior to wetting out is advantageous, in that immediately after wetting out and melting of the frozen bond, the outer surface of the product will tend to re-freeze producing a firmer product and facilitating peeling of the casing.

It has been found that by wetting the casing, the frozen product is in a state where the casing can be readily peeled from the product without the product adhering to the casing and without the product breaking during the peeling operation.

The following examples illustrate the process of the invention for preparing fresh skinless sausage:

EXAMPLE NO. 1

The following meat formulation was prepared in weight percent:
51% boneless lean pork (80% lean)
25% boneless pork (45% lean)
24% boneless pork fat The above meat formulation, at a temperature of about 38°F, was chopped using a conventional 3-bladed Seydelmann Chopper and during the chopping, the desired spices per 100 lbs. of meat were added. After chopping, the product was mixed and ground through a Hobart Mixer-Grinder using a 9/64 inch diameter plate. The ground emulsion was at a temperature of 43°F.

The above meat formulation was then stuffed into regenerated cellulose casings using a Selo Stuffer and Linker.

After linking, the product was then hung on racks and placed in a freezer to provide an internal 0°F. The product was then tempered in a 22°F cooler to an internal temperature of 18° to 20°F. Subsequently, the casing was wetted out by immersing the product in iced water. After an immersion period of about 10 minutes the casing was peeled from the product by use of a Ranger-Apollo peeler to provide uniform skinless fresh links which were packaged in institutional and retail packages.

EXAMPLE NO. 2

The following meat formulation was prepared in weight percent:
65% boneless lean pork (70% to 85% lean)
23% boneless pork (45% lean)
12% boneless back fat The above meat formulation, at a temperature of about 40°F was chopped using a conventional 3-bladed Seydelmann Chopper and during the chopping, 3 lbs. of water (55° – 60°F) per 100 lbs. of meat and the desired spices per 100 lbs. of meat were added. After chopping, the product was ground through a conventional meat grinder using a three-sixteenths inch diameter plate. The ground emulsion was at a temperature of 45°F.

The comminuted product was then stuffed into a regenerated cellulose casing using a Selo Stuffer, and the stuffed casing was then linked by Frankamatic automatic linking equipment.

After linking the product was then hung on racks and placed in a freezer to provide an internal product temperature of 12°F. Subsequently, the casing was wetted out by immersing the linked product in a brine solution at 26°F for 10 minutes. The casing was then peeled from the product by use of a Ranger-Apollo peeler to provide uniform skinless fresh sausage links which were packed in institutional and retail packages.

EXAMPLE NO. 3

The following meat mixture was prepared in weight percent:
50% boneless beef (50% lean)
50% boneless beef chucks (90% lean)

The meat mixture, at a temperature of 36°F, was ground through a ¼ inch diameter plate. The ground meat was then placed in a Hobart Mixer and 3 lbs. of water per 100 lbs. of meat and the desired spices per 100 lbs. of meat were added to the mixer and the mixture was mixed for 2 to 3 minutes.

The resulting formulation was ground through a ⅛ inch diameter plate. The finished emulsion had a temperature of 42°F.

The meat formulation was then stuffed in a cellulose casing using a conventional piston stuffer and subsequently, the stuffed casing was linked using a conventional tie linker.

The linked sausage was then transferred to a freezer to freeze the sausage to an internal temperature of 0°F. The casing was then wetted out by immersing the linked product in iced water at a temperature of 32°F for 8 minutes. The casing was immediately peeled to produce fresh skinless sausage links.

EXAMPLE NO. 4

The following meat mixture was prepared in weight percent:
50% boneless lean pork (70-80% lean)
50% boneless lean pork (50% lean)

The meat mixture, at a temperature of 45°F, was ground through a ⅜ inch plate, and the ground meat was then placed in a mixer. Ten pounds of textured soya protein per 100 lbs. of meat, 20 lbs. of water (55°–60°F) per 100 lbs of meat, and the desired spice per 100 lbs. of meat were added to the ground meat and mixed for 3 to 4 minutes.

The formulation was then ground through a 9/64 inch plate and the finished emulsion was at a temperature of 52°F.

The product was then stuffed into a cellulose casing utilizing a Selo Stuffer and was linked with a Frankamatic Linker. The linked sausage was then transferred to a freezer and chilled to provide an internal temperature of 15°F.

After the temperature of the product has been reduced to this level, the casing was wetted out by immersing the linked product in a brine solution at 28°F for 12 minutes. The wetted out casing was then peeled using a Ranger-Apollo peeler to provide fresh skinless sausage links that were subsequently packaged for institutional and retail sale.

As the method of the invention produces a fresh skinless sausage links utilizing disposable cellulose casing, a substantial reduction in price is obtained over sausage cased in the more expensive animal casing. Moreover, the skinless sausages made in accordance with the invention are more uniform in diameter and length than sausage using animal casing, thereby resulting in a packaged product having a more uniform link count.

While the above description has been directed to the making of fresh skinless sausage from meat, it is contemplated that other animal products, such as poultry or fish, can be substituted for the meat.

Various modes of carrying out the invention are contemplated as being within the scope of the following claims particularly pointing out and distinctly claiming the subject matter which is regarded as the invention:

We claim:

1. A method of making fresh skinless sausage, comprising the steps of comminuting a fresh meat formulation, stuffing the fresh meat formulation into a water permeable casing, linking the casing at intervals throughout its length to provide a series of uniform links, reducing the temperature of the linked product to below 32°F to freeze the product and provide a frozen bond between the casing and said meat formulation, wetting out the casing by contacting the casing with water for a period of time sufficient to cause said water to penetrate the casing and melt the frozen bond between the meat formulation and the casing while maintaining the meat formulation in a substantially frozen state, and peeling the wetted out casing from the frozen meat formulation to provide fresh skinless sausage links.

2. The method of claim 1, wherein the fresh meat formulation comprises meat containing from 20 to 50% by weight of fat.

3. The method of claim 2, wherein said meat is pork.

4. The method of claim 1, wherein the step of wetting out comprises immersing the product in water.

5. A method of making fresh skinless sausage, comprising the steps of comminuting a fresh meat formulation, said formulation containing 20 to 50% by weight of fat, stuffing the fresh comminuted meat formulation into a water permeable casing, linking the casing at intervals throughout its length to form a linked product, freezing the linked product by subjecting the product to a temperature below 32°F, contacting the frozen linked product with an aqueous liquid selected from the group consisting of water and a brine solution for a period of time sufficient to cause said aqueous liquid to penetrate the casing and melt the frozen bond between the meat formulation and the casing but insufficient to cause any substantial thawing of said meat formulation and thereafter substantially immediately stripping the casing from the linked frozen fresh meat formulation to provide skinless fresh sausage links.

6. The method of claim 5, wherein the aqueous liquid is at a temperature of below 34°F.

7. The method of claim 5, wherein the casing is composed of regenerated cellulose.

8. The method of claim 5, wherein the frozen linked product is at a temperature of −10°F to +22°F.

* * * * *